United States Patent
Su et al.

(10) Patent No.: US 7,660,273 B2
(45) Date of Patent: Feb. 9, 2010

(54) WLAN DATA RECEPTION METHOD AND WLAN DEVICE

(75) Inventors: Jiun-Jang Su, Taipei (TW); Hsin-Chin Hsu, Taipei (TW); Sheng-Chung Chen, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 458 days.

(21) Appl. No.: 11/268,838

(22) Filed: Nov. 8, 2005

(65) Prior Publication Data

US 2007/0104159 A1    May 10, 2007

(51) Int. Cl.
*H04W 4/00* (2009.01)
(52) U.S. Cl. .................. 370/311; 370/310; 370/336; 455/73
(58) Field of Classification Search .................. 370/338
See application file for complete search history.

(56) References Cited

U.S. PATENT DOCUMENTS

| | | | |
|---|---|---|---|
| 7,233,588 B1 * | 6/2007 | Stratigakis .................. 370/350 |
| 7,305,259 B1 * | 12/2007 | Malone et al. .............. 455/574 |
| 2004/0131127 A1 * | 7/2004 | Nadiri et al. ................ 375/271 |
| 2005/0018706 A1 * | 1/2005 | Myojo ........................ 370/445 |
| 2005/0190738 A1 * | 9/2005 | Smavatkul et al. .......... 370/346 |
| 2005/0227615 A1 * | 10/2005 | Sakoda .......................... 455/7 |
| 2006/0019686 A1 * | 1/2006 | Rush et al. .................. 455/501 |
| 2006/0133304 A1 * | 6/2006 | Tanach ........................ 370/311 |
| 2007/0162773 A1 * | 7/2007 | Krantz et al. ............... 713/300 |

* cited by examiner

*Primary Examiner*—Rafael Pérez-Gutiérrez
*Assistant Examiner*—German Viana Di Prisco
(74) *Attorney, Agent, or Firm*—Thomas, Kayden, Horstemeyer & Risley

(57) ABSTRACT

A method and device of receiving WLAN data. The device comprises a transceiver module and a controller module. The transceiver module transmits first data and receives second data. The controller module is coupled to the transceiver module, and disables the transceiver module for a first period based on interframe space (IFS), upon completion of data transmission in the transceiver module.

16 Claims, 5 Drawing Sheets

WLAN DATA RECEPTION METHOD AND WLAN DEVICE

BACKGROUND

The invention relates in general to wireless communication, and in particular, to a method and device for Wireless Local Area Network (WLAN) data reception.

Wireless devices employing portable power storage cells such as batteries, with inherently limited storage capacity, require effective power management solution.

As the popularity of Wireless Local Area Network (WLAN) grows, it is desirable to develop an efficient power scheme for WLAN mobile devices.

WLAN deploys Carrier Sense Multiple Access with Collision Avoidance (CSMA/CA) scheme as a data access method, with transmission media shared by every station in the network. Any station wishing to conduct a transmission has to sense the condition of the transmission channel in advance. If the channel is already occupied by a data transmission, the station waits until the channel is released again, and may then transmit data. After data transmission, regulation requires each station to postpone for a finite period of time, known as an InterFrame Space (IFS) period, prior to the next data transmission. Since no data transmission occurs during the IFS period, data reception consumes unnecessary power in the WLAN device.

Thus it is important to provide improved management of the power utilization for WLAN devices.

SUMMARY

A method and device for receiving a WLAN data in a WLAN device. According to one embodiment of the invention, a method of data reception in a Wireless Local Area Network (WLAN) device is explained. The method comprises transmitting first data from a transceiver module of the WLAN device. The method also comprises disabling the transceiver module for a first period based on Interframe Space (IFS), upon completion of the transmission. The method further comprises receiving second data in the transceiver module.

In another embodiment of the invention, a WLAN device comprising a transceiver module and a controller module is provided. The transceiver module transmits first data and receives second data. The controller module is coupled to the transceiver module, and disables the transceiver module for a first period based on interframe space (IFS), upon completion of data transmission in the transceiver module.

According to another embodiment of the invention, a method for receiving a WLAN data in a WLAN device is described. The method comprises transmitting first data from a transceiver module of the WLAN device, disabling a RF module in the transceiver module for a first period based on Interframe Space (IFS), upon completion of the transmission. The method further comprises processing second data in the RF module after disabling, suspending a baseband module in the transceiver module for a second period based on Interframe Space upon completion of the transmission, and receiving the second data in the baseband module after completing the suspension.

BRIEF DESCRIPTION OF THE DRAWINGS

The invention will become more fully understood from the detailed description, given hereinbelow, and the accompanying drawings. The drawings and description are provided for purposes of illustration only and, thus, are not intended to be limiting of the present invention.

DETAILED DESCRIPTION

Figure 1:
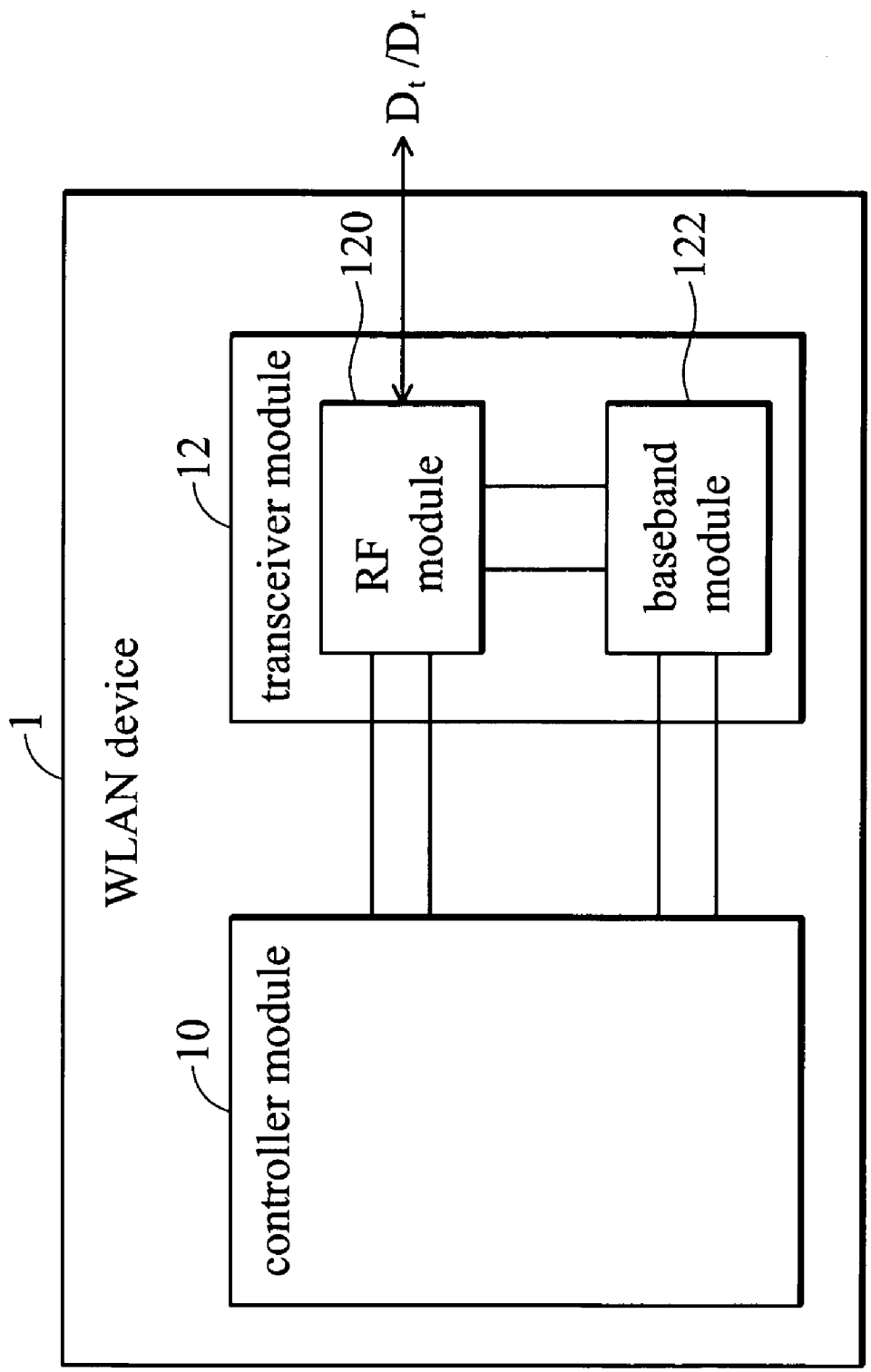
FIG. 1 is a block diagram of a WLAN device according to an embodiment of the invention.
Figure 2:
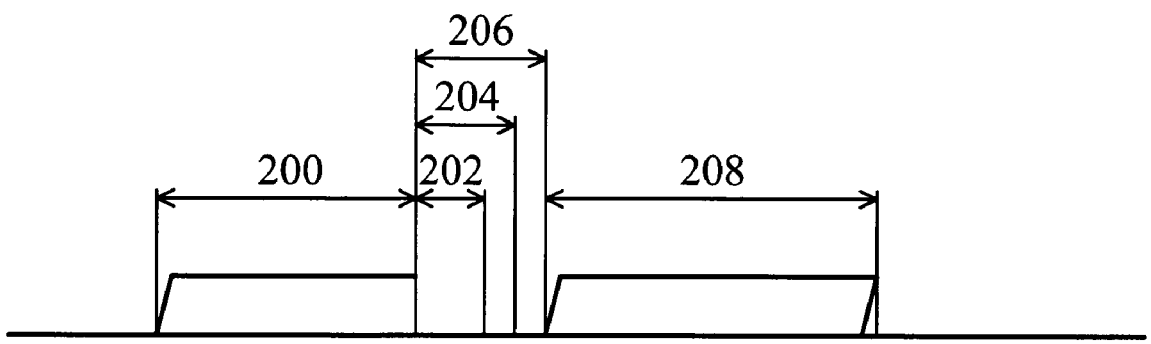
FIG. 2 is a schematic diagram of an IFS timing relationship in WLAN IEEE 802.11 specification.

FIG. 1 is a block diagram of a WLAN device according to an embodiment of the invention, comprising a controller module 10 and a transceiver module 12. Controller module 10 is coupled to transceiver module 12, and enables and disables transceiver module 12. When transceiver module 12 is enabled, WLAN data is received and processed thereat. When disabled, transceiver module 12 is no data traffic exists, and power consumption is reduced. Transceiver module 12 transmits first data Dt and receives second data Dr. Controller module 10 disables transceiver module 12 for a first period upon completion of data transmission therein, then enables transceiver module 12 to receive the second data Dr. The first period is based on Interframe Space (IFS) as shown in FIG. 2, a schematic diagram of IFS timing relationship compliant with WLAN IEEE 802.11 specification, comprising transmission data frame 200, short IFS (SIFS) 202, Point Coordinated Function IFS (PIFS) 204, Distributed Coordinated Function IFS (DIFS) 206, and reception data frame 208.

Transceiver module 12 incorporates radio frequency (RF) module 120 and baseband module 122. RF module 120 is coupled to controller module 10. Baseband module 122 is coupled to controller module 10 and RF module 120.

RF module 120 receives and processes the second data Dr from the transmission channel. Baseband module 122 receives the second data Dr from RF module 120. As transceiver module 12 is enabled, controller module 10 further disables baseband module 122 for a second period, while enabling RF module 120 to process the second data Dr. Baseband module 122 is enabled by controller module 10 after the second period, receives the WLAN data from the RF module for the subsequent baseband process.

Figure 3A:
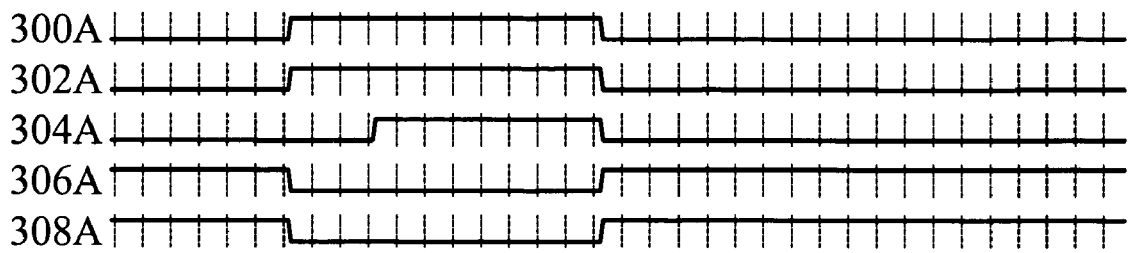
FIGS. 3(a) and (b) are timing diagrams of selected signals in the conventional technology and in the invention, incorporating the WLAN device in FIG. 1.
Figure 3B:
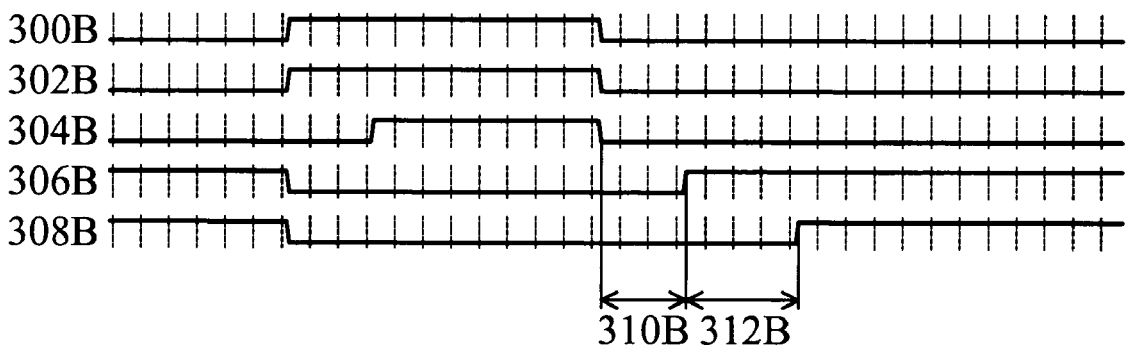

FIGS. 3(a) and (b) are timing diagrams of selected signals in the related art and in the invention, incorporating the WLAN device in FIG. 1. FIG. 3(a) shows TXRX_Switch signal 300a, RF_TXEN signal 302a, BB_TXRDY signal 304a, RF_RXEN signal 306a, and BB_RXEN 308a. FIG. 3(b) involves TXRX_Switch signal 300b, RF_TXEN signal 302b, BB_TXRDY signal 304b, RF_RXEN signal 306b, and BB_RXEN signal 308b. TXRX_Switch signals 300a and 300b control transceiver mode of WLAN device 2, with "high" for transmission and "low" for reception. RF_TXEN signals 302a and 302b enable data transmission of RF module 120, BB_TXRDY signals 304a and 304b indicate ongoing data transmission in baseband module 122, RF_RXEN signals 306a and 306b enable data reception of RF module 120, and BB_RXEN signals 308a and 308b enable data reception of baseband module 122, with "high" for enablement and "low" for disablement.

Referring to FIG. 3(a), as TXRX_Switch signal 300a switches from high to low, transmission mode of WLAN device 2 changes from transmitting to receiving, such that transmission control signals including RF_TXEN signal 302a and BB_TXRDY signal 304a switch from high to low, while reception control signals RF_RXEN signal 306a and BB_RXEN signal 308a switch from low to high.

Referring to FIG. 3(b), as TXRX_Switch signal 300b switches from high to low, WLAN device 2 changes from transmitting to receiving mode, such that transmission control signals including RF_TXEN signal 302b and BB_TXRDY signal 304b switch from high to low, RF_RXEN signal 306b turns from low to high after the first period 310b, and BB_RXEN signal 308b further turns from low to high after the second period 312b.

Figure 4:
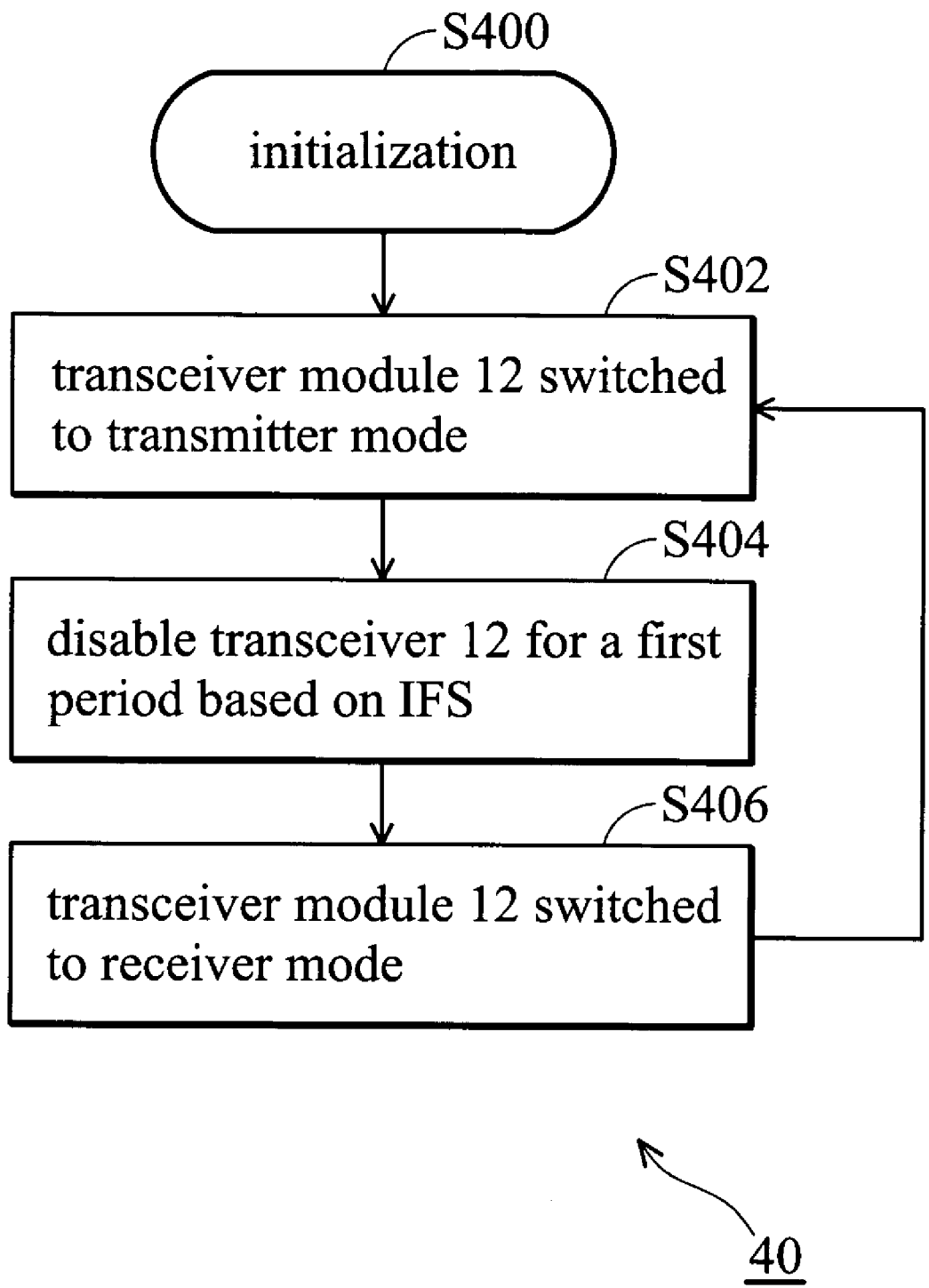
FIG. 4 is a flowchart of a data reception method incorporated in the WLAN device in FIG. 1, according to an embodiment of the invention.

FIG. 4 is a flowchart of a data reception method incorporated in the WLAN device in FIG. 1, according to an embodiment of the invention.

Upon initialization in step S400, transceiver module 12 is switched to a transmitter mode, gains access to a transmission channel and transmits first data Dt therethrough in step S402 to request data reception. The first data Dt and the transmission channel are compliant with IEEE 802.11.

In step S404, transceiver module 12 is disabled for a first period based on Interframe Space (IFS), upon completion of step S402. The first period may be realized by calculating the first period with a first counter. IFS may be short IFS (SIFS), Point Coordinated Function IFS (PIFS), Distributed Coordinated Function IFS (DIFS), or extended IFS (EIFS).

In step S406, transceiver module 12 receives second data Dr from the transmission channel. Data reception method 40 then undergoes steps S402, S404, S406 repeatedly until completion of the method.

Figure 5:
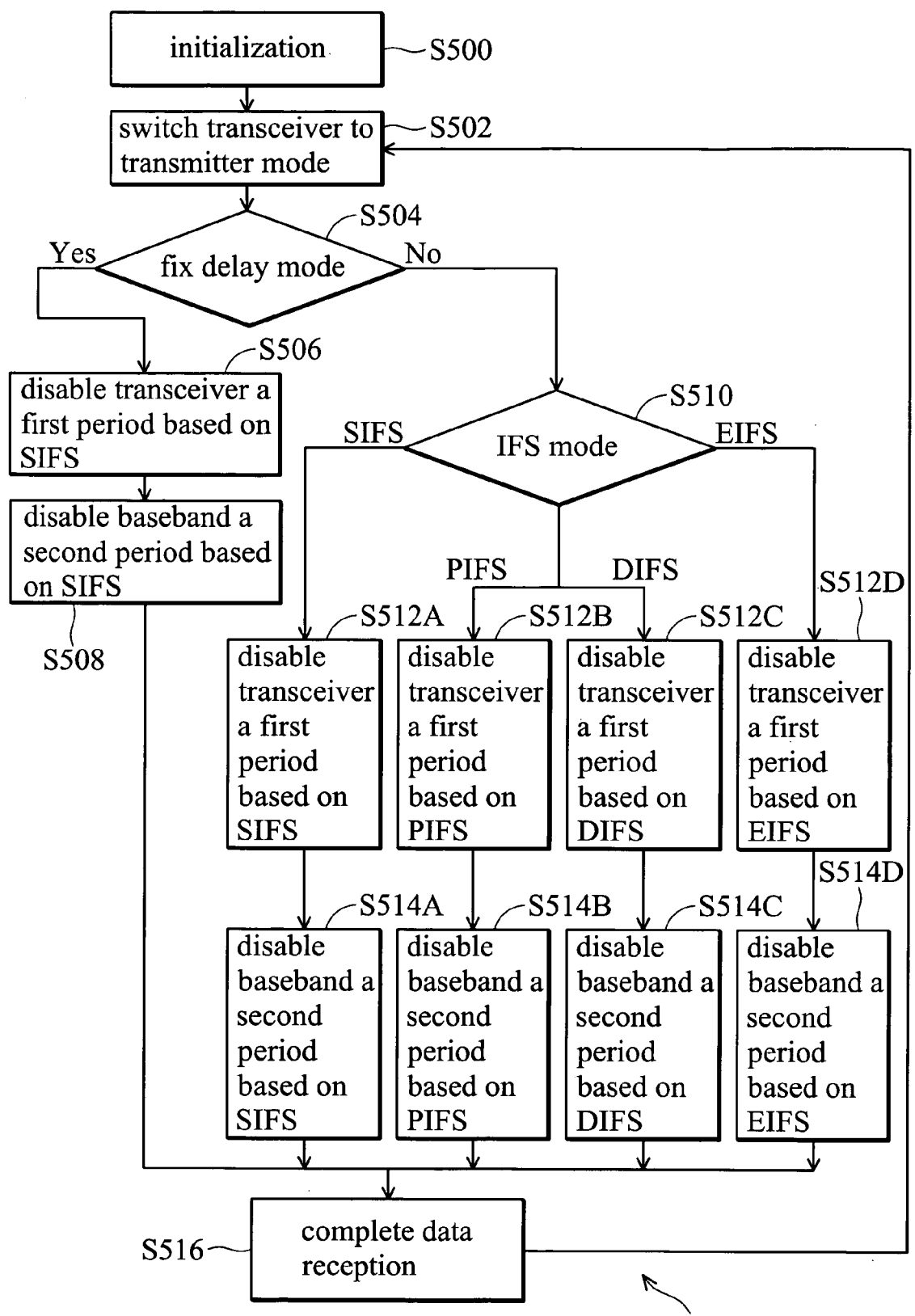
FIG. 5 is a flowchart of another data reception method incorporated in the WLAN device in FIG. 1, according to an embodiment of the invention.

FIG. 5 is a flowchart of another data reception method incorporated in the WLAN device in FIG. 1, according to an embodiment of the invention.

Upon initialization in step S500, transceiver module 12 transmits first data Dt through a transmission channel in step S502 to request data reception. The first data Dt and the transmission channel are compliant with IEEE 802.11.

Upon completion of step S502, controller module 10 determines if a fixed delay mode is employed in step S504, in which controller module 10 disables transceiver module 12 for a first period based on Short IFS (SIFS), irrespective of the operating IFS mode. An adaptive delay mode is utilized if controller module 10 determines the fixed delay mode is not used, with transceiver module 12 disabled for a first period according to the operating IFS mode.

In step S506, controller module 10 disables RF module 120 and baseband module 122 for the first period based on SIFS. Followed by step S508, controller module 10 further disables RF module 120 for a second period while receiving and processing the second data Dr in RF module 120. The first period may be realized by calculating the first period with a first counter, and the second period by calculating with a second counter. The fixed period configuration yields a simpler design for the WLAN device. A minimal deferral period with SIFS period is incorporated in transceiver module 12 to reduce power consumption, while the data retrieval for the other IFS modes is still retained.

If the fixed delay mode is not utilized, in step S510 controller module 10 determines the IFS mode, and assigns the first period accordingly. The IFS mode may be Short IFS (SIFS), Point Coordinated Function IFS (PIFS), Distributed Coordinated Function IFS (DIFS), and extended IFS (EIFS). Each IFS mode may be assigned a dedicated deferral period. The adaptive period offers the flexibility to optimize the maximal deferral period for each IFS mode.

In step S512A, B, C, and D, controller module 10 disables RF module 120 and baseband module 122 for the first period based on SIFS, PIFS, DIFS, and EIFS respectively. Followed by step S514A, B, C, and D, controller module 10 further disables RF module 120 for a second period based on SIFS, PIFS, DIFS, and EIFS respectively, while receiving and processing the second data Dr in RF module 120. The first period may be realized by calculating the first period with a first counter, and the second period by calculating with a second counter.

Subsequently in step S516, baseband module 122 receives the second data Dr from RF module 120, which continues receiving the remaining second data Dr. Data reception method 50 then returns to step S502 for the next round of data transmission until completion of the method.

Another exemplary data reception method of the invention incorporating the WLAN device in FIG. 1 is described. Upon initialization of data reception method 60, transceiver module 12 transmits the first data Dt. Controller module 10 then disables RF module 120 for a first period based on Interframe Space (IFS), upon completion of the transmission. Next RF module 120 receives and processes the second data Dr while controller module 10 suspends baseband module 122 for a second period based on the IFS. Finally baseband module 122 receives the second data Dr after completing the suspension.

The first and the second period may be fixed based on SIFS, or adapted according to an IFS mode among SIFS, PIFS, DIFS, and EIFS. The second period equals or exceeds the first period. The first period may be realized by calculating the first period with a first counter, and the second period by calculating with a second counter.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of data reception in a Wireless Local Area Network (WLAN) device, comprising:

transmitting first data from a transceiver module of the WLAN device;

disabling the transceiver module for a first period based on Interframe Space (IFS), immediately following the completion of the transmission; and receiving second data in the transceiver module;

determining a mode of the interframe space among Short IFS (SIFS), Point Coordinated Function IFS (PIFS), Distributed Coordinated Function IFS (DIFS), and extended IFS (EIFS); and assigning the first period adaptively according to the mode of the interframe space.

2. The method of claim 1, wherein the transceiver module comprises a radio frequency (RF) module and a baseband module coupled to the RF module, and the receiving step comprises:

disabling the baseband module for a second period, while processing the second data in the RF module; and receiving the second data from the RF module in the baseband module.

3. The method of claim 2, further comprising calculating the second period with a second counter.

4. The method of claim 1, wherein the first period is fixed.

5. The method of claim 4, wherein the first period is based on Short IFS (SIFS).

6. The method of claim 1, further comprising calculating the first period with a first counter.

7. A WLAN device receiving WLAN data, comprising:
a transceiver module transmitting first data and receiving second data; and
a controller module coupled to the transceiver module, and disabling the transceiver module for a first period based on interframe space (IFS), immediately following the completion of data transmission
wherein the first period is adaptive, and the controller further determines a mode of IFS among Short IFS (SIFS), Point Coordinated Function IFS (PIFS), Distributed Coordinated Function IFS (DIFS), and extended IFS (EIFS), and assigns the first period according to the mode of the interframe space.

8. The WLAN device of claim 7, wherein the transceiver module comprises:
a radio frequency (RF) module coupled to the controller module, processing the second data; and
a baseband module coupled to the RF module and the controller module, receiving the second data from the RF module; and
wherein the controller module further disables the baseband module for a second period while enabling the RF module.

9. The WLAN device of claim 8, wherein the controller module further comprises a second counter calculating the second period.

10. The WLAN device of claim 7, wherein the first period is fixed.

11. The WLAN device of claim 10, wherein the fixed period is based on short IFS (SIFS).

12. The WLAN device of claim 7, wherein the controller module further comprises a first counter calculating the first period.

13. A method of data reception in a WLAN device, comprising:
transmitting first data from a transceiver module of the WLAN device;
disabling a RF module in the transceiver module for a first period based on Interframe Space (IFS), immediately following the completion of the transmitting step;
processing second data in the RF module after completing the disabling step;
suspending a baseband module in the transceiver module for a second period based on Interframe Space, upon completion of the transmission; and
receiving the second data in the baseband module after completing the suspension
wherein the first and the second periods are adaptive with accordance to a mode of the interframe space, and the mode of the interframe space is determined among SIFS, PIFS, DIFS and EIFS.

14. The method of claim 13, wherein the first and the second period are based on SIFS.

15. The method of claim 13, wherein the second period equals or exceeds the first period.

16. The method of claim 13, further comprising calculating the first period and the second period with a first counter and a second counter respectively.

* * * * *